(12) United States Patent
Oberkofler

(10) Patent No.: US 6,837,659 B2
(45) Date of Patent: Jan. 4, 2005

(54) FASTENER FOR JOINING HONEYCOMB PANELS AND METHOD FOR USING THE SAME

(76) Inventor: Hermann Oberkofler, 9823 Titan Dr., San Antonio, TX (US) 78217

( * ) Notice: Subject to any disclaimer, the term of this patent is extended or adjusted under 35 U.S.C. 154(b) by 372 days.

(21) Appl. No.: 10/071,286

(22) Filed: Feb. 8, 2002

(65) Prior Publication Data

US 2003/0152438 A1 Aug. 14, 2003

(51) Int. Cl.[7] .............................. F16B 1/00; F16B 15/00
(52) U.S. Cl. ........................ 411/82.1; 411/82; 411/479; 411/930
(58) Field of Search ........................ 411/82, 82.1, 82.2, 411/258, 479, 930

(56) References Cited

U.S. PATENT DOCUMENTS

| 4,224,971 A | 9/1980 | Muller et al. |
| 4,370,372 A | 1/1983 | Higgins et al. |
| 4,712,957 A | 12/1987 | Edwards et al. |
| 5,145,301 A | * 9/1992 | Yamamoto ................... 411/82 |
| 5,209,805 A | 5/1993 | Spraggins |

FOREIGN PATENT DOCUMENTS

| DE | 3733621 | * 4/1989 | .................. 411/82 |

* cited by examiner

Primary Examiner—Neill Wilson
(74) Attorney, Agent, or Firm—Jackson Walker LLP

(57) ABSTRACT

A method and fastener for distributing an anchoring material and securing abutting honeycombed panels in a generally perpendicular alignment. The fastener is provided with a pointed tip to penetrate into undrilled portion of the inner cellular structure of one of the panels. The hollow fastener allows for the injection and distribution of an anchoring material into the ruptured cell core and into predrilled bores in the first panel.

13 Claims, 4 Drawing Sheets

Prior Art

Prior Art

FASTENER FOR JOINING HONEYCOMB PANELS AND METHOD FOR USING THE SAME

BACKGROUND OF THE INVENTION

The present invention relates to a novel method and fastener for joining composite honeycomb panels. More particularly, a pointed fastener is provided to penetrate the internal cell structure of honeycomb construction panels without destroying the internal integrity of the honeycomb and without requiring drilling of bores through selected panels prior to insertion of the fasteners.

Existing fasteners utilized in the assembly of the T or L joints with honeycomb panels have been blunt-nosed and have required drilling bores through the first panel and the perpendicularly abutting panel before the insertion of the blunt-nosed, hollow, tubular fastener. After the fastener is in place through the predrilled bores, an adhesive or anchoring material is injected through the center of the hollow fastener and into the internal cell structure. U.S. Pat. No. 4,370,372 teaches currently utilized technologies.

With the introduction of computer numerically controlled (CNC) technology, there has arisen a need to modify the joining processes with existing honeycomb panels. CNC machines precut composite honeycomb panels and pre-drill holes or bores in the flat panel according to design standards. However, abutting panels are not predrilled. Thus, in order to join a first, flat panel with a perpendicularly abutting panel, the panels are first secured in a jig to properly align the panels for drilling (through the predrilled bore into the undrilled abutting panel) and for the insertion of the blunt-nosed fastener.

One embodiment of the present invention eliminates the necessity to pre-drill the abutting panel. A small, pointed fastener of one embodiment of the present invention provides the capability for penetrating the outer sheet member of an abutting composite honeycomb panel, passing through the internal cell structure of the abutting panel without collapsing or destroying the cell integrity in the abutting panel, and joining the predrilled flat panel with the abutting panel. It further allows for the elimination of clumsy and expensive jigs or frames for holding the panel cabinetry during fabrication.

DETAILED DESCRIPTION OF THE PREFERRED EMBODIMENT

Figure 1:
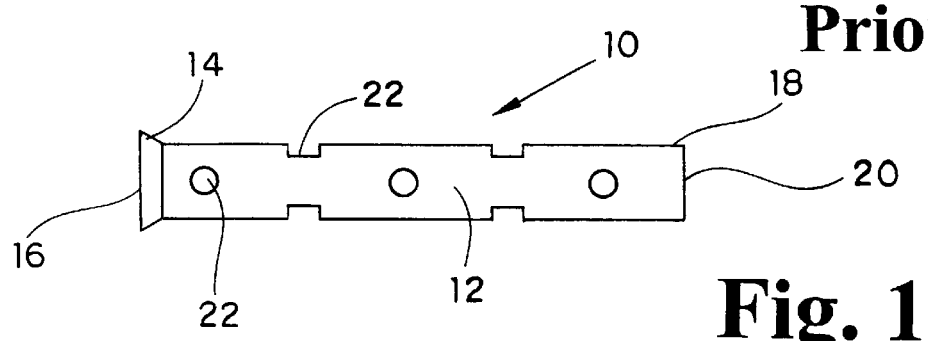
FIG. 1 illustrates a prior art fastener.

FIG. 1 illustrates a prior art fastener 10 having a generally hollow cylindrical body portion 12. On a first end is provided a flared head 14 with an opening 16 into the hollow inner section of the body 12. At an opposite end is a blunt nose 18 with an anchoring material discharge opening 20. Along the length of the fastener 10 are provided a plurality of anchoring material discharge openings 22 which allow anchoring material or adhesive injected through the opening 16 flared head 14 to pass from the inside of the body 12 into the cell structure of joined honeycomb panels as will be described below.

Figure 2:
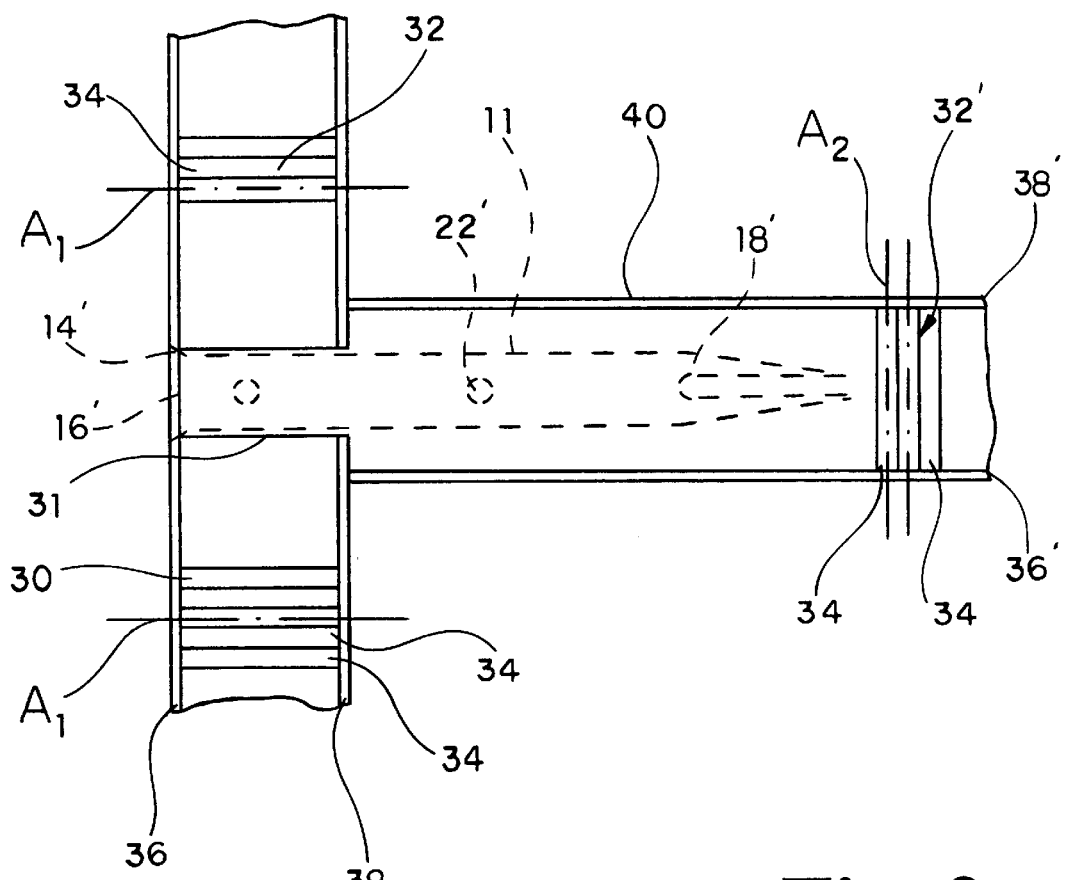
FIG. 2 shows abutting panels of the present invention in a partial top view.

FIG. 2 is a partial top view of abutting honeycomb panels joined by a fastener of the present invention shown in broken lines. A first flat panel 30 of well known honeycomb panel construction has a cellular core 32 formed from a multiplicity of side-by-side similar parallel cells 34 (normally $3/16$ inch in diameter) sandwiched between stiff parallel outer cover sheet members 36 and 38 made of moisture impervious composition. The panel is normally $1/8$ to 1 inch in thickness. The core 32 may be of a thin paper-like, cellulose fiber material covered with shellac and defining thin hexagonal cell walls. The outer cover sheet members 36 and 38 may be quite thin, hard sheets of woven or non-woven fiberglass bonded in a suitable stiffening resin or similar inert fibrous material secured by adhesive (or equivalent) across the opposite ends of all of the core cells to effectively close the cells. Each of the cells have a longitudinal axis $A_1$.

A second panel 40 of similar construction is shown in FIG. 2 in generally perpendicular abutment with the first panel 30. Each of the cells $34^1$ of the cellular core $32^1$ of the second panel 40 has a longitudinal axis $A_2$. When the panels are joined, axes $A_1$ are generally perpendicular to axes $A_2$.

The first step in securing panels 30 and 40 in an abutting arrangement is to form all fastener bores 31 at right angles to the plane of panel 30 according to specifications of the design standard. This is most effectively accomplished by the use of computer numerically controlled (CNC) machines, but may be accomplished by other drilling or punching technologies. The predrilled bores 31 are the same diameter as the fastener 11 to allow for ready slidable insertion of the fastener 11 through the bore 31.

Figure 3:
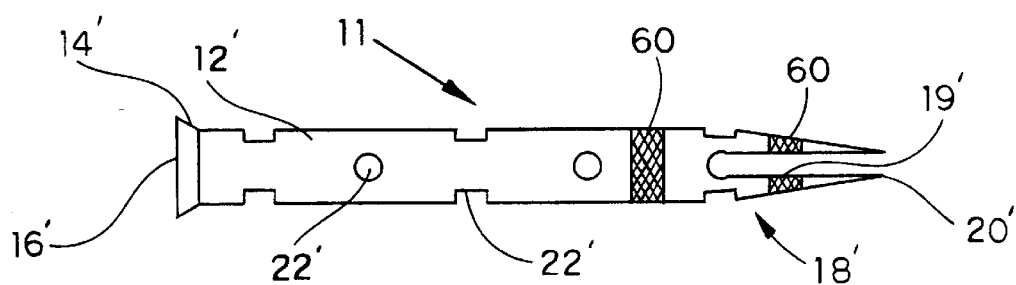
FIG. 3 illustrates a side elevation view of one embodiment of the fastener of the present invention.
Figure 3A:
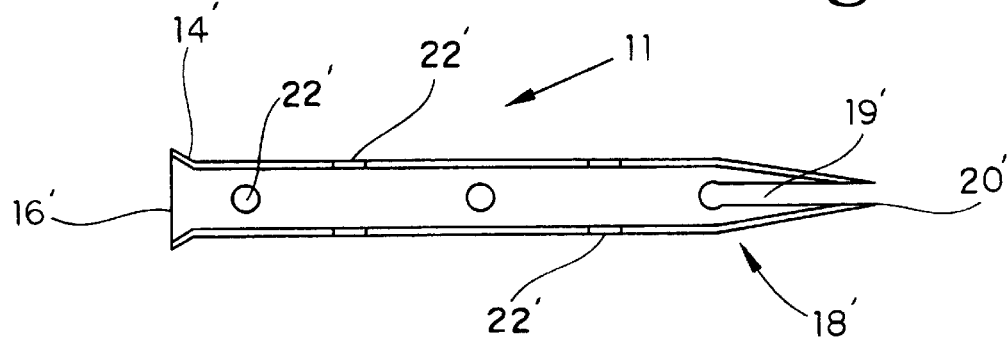
FIG. 3A shows the fastener of FIG. 3 in cross section.

FIG. 3 illustrates one embodiment of the present fastener 11. The fastener has a flared head $14^1$ to limit insertion of the fastener and to terminate the fastener flush with the outer shell member 36 of panel 30 (see FIGS. 2 and 3). An insertion end $18^1$ of the fastener 11 is pointed, allowing for easy penetration of the inner fiber cell structure $32^1$ of the second panel without crushing the cell walls and destroying the overall integrity of the honeycomb core. The second panel is not predrilled; and, therefore, there is no need to align bore holes or place the panels in an alignment jig or frame.

Typically, the fastener 11 is a relatively rigid aluminum tube one-and-a-half (1½) to five (5) inches long with a uniform body diameter of $3/16$ inch to ½ inch. The discharge openings $22^1$ are a serial of $3/32$ inch (diameter) longitudinally and peripherally spaced circular apertures. The pointed end $18^1$ has a plurality of slotted openings $19^1$ $3/8$ inch to one inch in length peripherally disposed. While the fastener is generally metal, other stiff or rigid substitute material compositions may be used.

It should be understood that the diameter of the fastener 11 is greater than the diameter of the cells 34 and $34^1$ so that as the pointed end $19^1$ of the fastener penetrates the abutting panel 40, it creates its own bore. Surrounding cells are ruptured in the same direction as the inserted fastener. This rupturing action creates disjoined cell wall sections $35^1$ which urge against the fastener 11 to cause a frictional force to keep the fastener from disengaging from the penetrated core section. Further, the outer surface of the fastener 11 may be provided with one or more knurled sections 60 which cooperate with the disjoined cell walls 35$^1$ to enhance the retention of the fastener in the penetrated bore until the anchoring material is injected and hardens.

Figure 4:
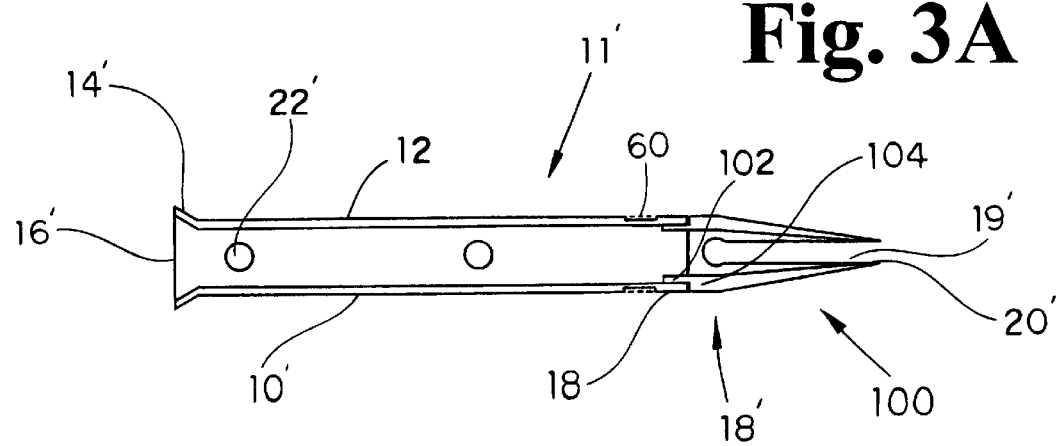
FIG. 4 shows a cross sectional view of an alternative embodiment of the present invention.

FIG. 4 illustrates another embodiment of the present invention. A prior art fastener 10 has been adapted to receive in the blunt nose 18 a pointed insert 100. Insert 100 has an appropriately sized collar 102 and shoulder 104 to fit within and abut against the opening 20. The insert 100 has a discharge opening 20$^1$ and a plurality of discharge slots 19$^1$ to allow anchoring material to be injected into the cell core as previously described. Thus, in the embodiment of FIG. 4, a prior art fastener may be modified or retrofitted to function as an improved fastener of the present invention.

Figure 5:
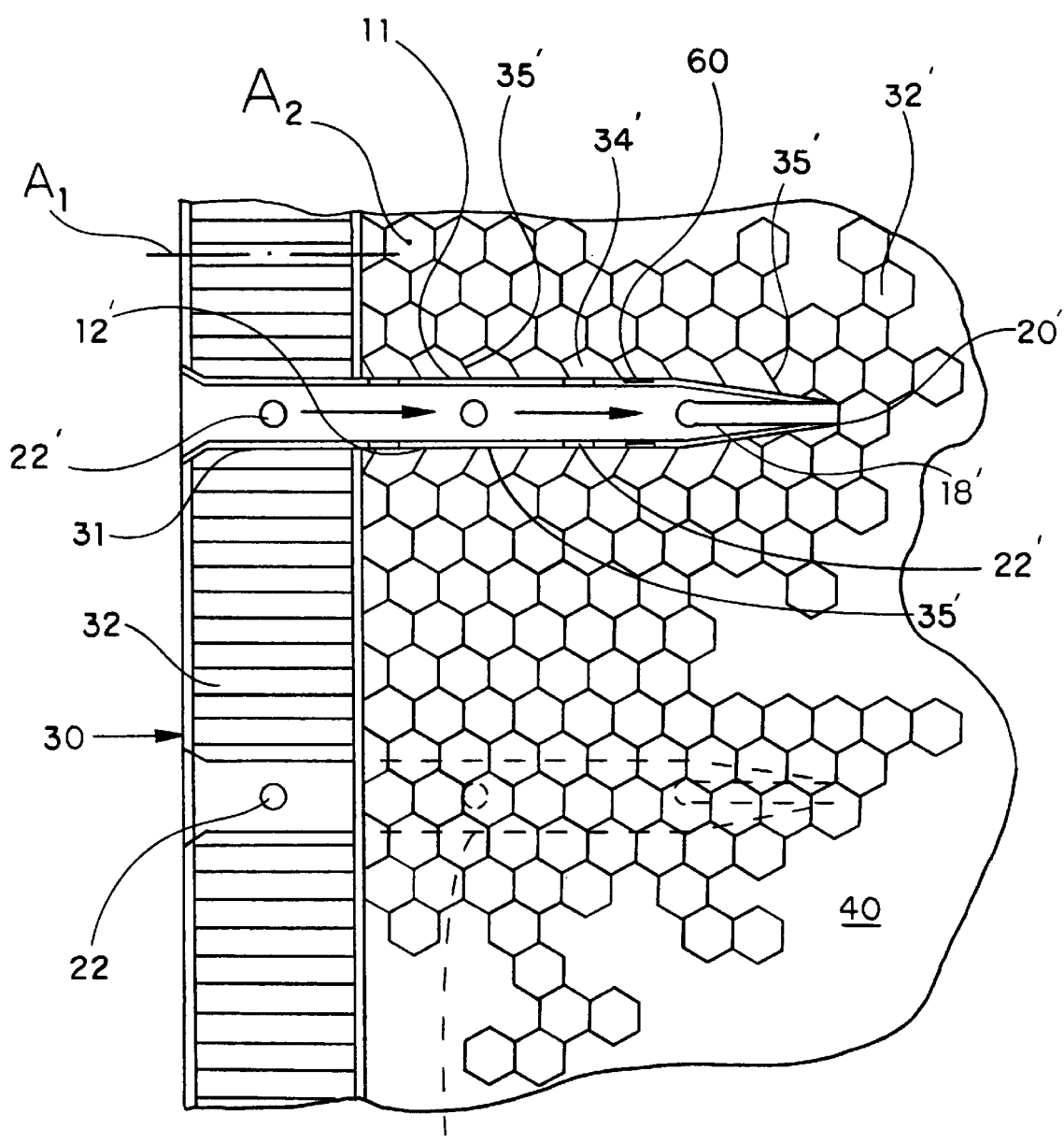
FIG. 5 illustrates a partial side elevation view of abutting panels and fasteners of the present invention.

FIG. 5 shows a partial side elevation view of abutting panels 30 and 40 and fastener 11 of the present invention. It may be seen that the fastener 11 has been passed through predrill bore 31 and pointed end 18$^1$ has penetrated the core 32$^1$ rupturing some cells 34$^1$ creating disjoined fiber cell walls 35$^1$ urged in the direction of penetration (arrow) and against the outer surface of the fastener.

It should be noted that the cell core 32$^1$ has not collapsed and the overall integrity of the core is maintained except where the pointed end 18$^1$ has punctured a cell 34$^1$. A clamp or jig would normally be used to hold the panels 30 and 40 in an assembled/joined relation. However, with the present fasteners 11 and 11$^1$ this is not necessary as the joint end 18$^1$ penetrates the cell structure and creates its own bore.

Figure 6:
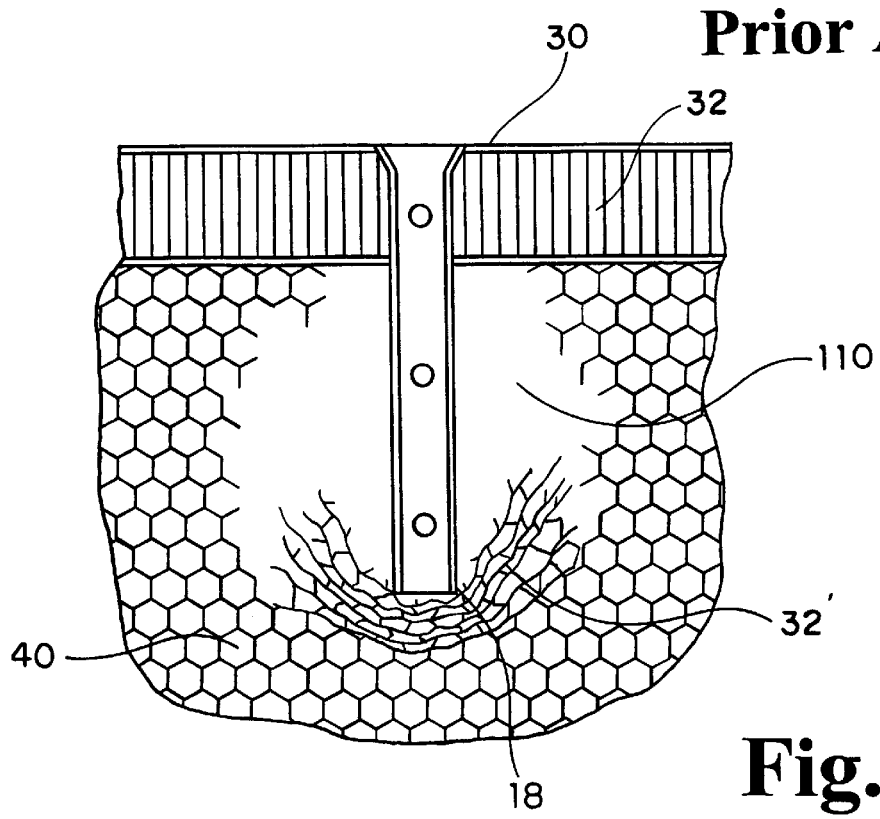
FIG. 6 depicts a prior art fastener pressed into an undrilled abutting panel thereby collapsing and destroying the cell integrity.

FIG. 6 illustrates the problem of attempting to use a prior art fastener 10 without predrilling bores in the second abutting panel 40. The blunt nose 18 crushes and collapses the cell core 32, tearing the cell walls far from the outer surface of the body 12. Not only is the honeycomb structure's integrity destroyed, but excessive anchoring material would be injected to fill the huge void 110 created by the tearing action of the blunt nose 18.

Figure 7:
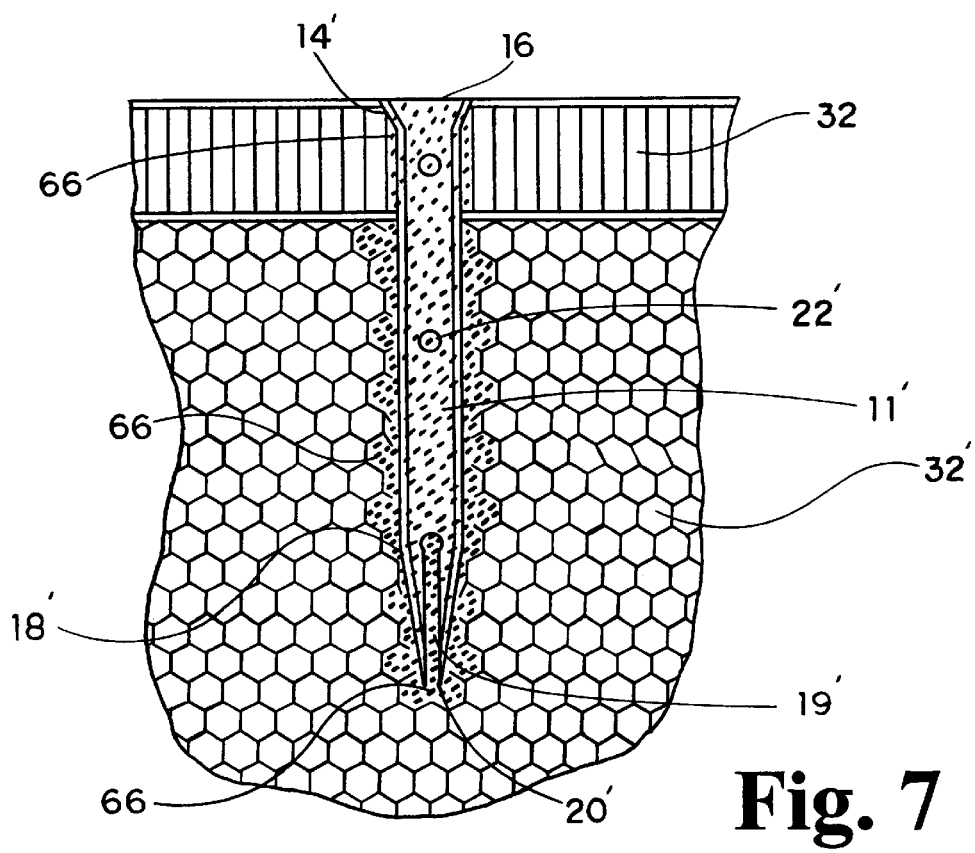
FIG. 7 is a partial cross sectional view of the present invention with anchoring material injected through the fastener and into the cell structures.

One purpose of the pointed end 18$^1$ of the present invention is to allow for a controlled penetration and rupturing of only the necessary cells. FIG. 7 shows how anchoring material 66 fills only the most adjacent opened cells thereby minimizing the amount of material 66 which must be injected through the fastener 11$^1$ out of the discharge openings 19$^1$, 20$^1$, and 22$^1$, and into the cores 32 and 32$^1$ out the discharge openings 19$^1$ and 22$^1$.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

What is the claimed is:

1. A fastener for use with honeycomb panels, said fastener distributing an anchoring material and securing a first predrilled honeycomb panel having first and second sheet members enclosing a first internal fiber cell structure, said first panel having predrilled fastener bores extending through said outer sheet members and said first internal cell structure, wherein cells of said first cell structure have a first longitudinal axis, to an abutting second undrilled honeycomb panel having third and fourth sheet members enclosing a second internal fiber cell structure, wherein cells of said second cell structure have a second longitudinal axis, said first and said second longitudinal axis being generally perpendicular when said panels are in a secured position, said fastener comprising:

a generally hollow, cylindrical body portion having a first open-end for receiving said anchoring material, and a second pointed tip having an anchoring material discharge opening, said body portion having a plurality of anchoring material discharge openings disposed therein for communicating said anchoring material from said body portion to said second internal cell structure.

2. The fastener of claim 1 further comprising a knurled surface section on an outer wall of said body portion, said knurled surface section urging fibers of said second fiber cell structure of said second undrilled honeycomb panel into tension against said body portion to hold said fastener within said second internal fiber cell structure.

3. The fastener of claim 2 further comprising a longitudinal slot extending along said outer wall from a distal-most end of said pointed tip to a proximal region of said body.

4. The fastener of claim 1 wherein said body portion has a generally uniform diameter from said proximal region to a flared head section, said body portion diameter greater than the diameter of an individual cell of said first and second internal fiber cell structure of said panels.

5. The fastener of claim 1 wherein each of said first and second honeycomb panels has an approximately equal thickness, and said fastener has a length greater than said thickness of each of said panels.

6. The fastener of claim 1 wherein said second pointed tip is adapted to be received and retained in a blunt end of said body portion opposite said first open end.

7. A method for distributing an anchoring material and securing a first predrilled honeycomb panel having first and second outer sheet members enclosing a first internal fiber cell structure, said first panel having predrilled fastener bore holes extending through said outer sheet members and said first internal cell structure wherein cells of said first cell structure have a first longitudinal axis, to a second undrilled honeycomb panel having third and fourth sheet members enclosing a second internal fiber cell structure wherein cells of said second cell structure have a second longitudinal axis comprising the steps of:

abutting said first predrilled panel with said second undrilled panel such as said first longitudinal cell axes are generally perpendicular to said second longitudinal cell axes;

inserting a fastener through said predrilled boxes in said first panel, said fastener comprising:

a generally hollow, cylindrical body portion having a first open end for receiving said anchoring material and a second pointed tip having an anchoring material tip discharge opening, said body portion having a plurality of anchoring material body discharge openings disposed therein for communicating said anchoring material from said body portion to said second internal cell structure;

penetrating said second internal cell structure with a second pointed tip such that said cell walls of said second internal cell structures are ruptured but not collapsed thereby forming irregular shaped spaces between adjacent cells in said second panel;

injecting said anchoring material into said fastener with sufficient force to cause said material to pass through said body portion, out said body and tip discharge openings into said bores within said first internal cell structure and into said irregular shaped spaces between adjacent cells in said second panel;

allowing said anchoring material to harden thereby securing said panels in a secured position.

8. A fastener and honeycomb panel combination, said fastener distributing an anchoring material and securing a first predrilled honeycomb panel having first and second sheet members enclosing a first internal fiber cell structure, said first panel having predrilled fastener bores extending through said outer sheet members and said first internal cell structure, wherein cells of said first cell structure have a first longitudinal axis, to an abutting second undrilled honeycomb panel having third and fourth sheet members enclosing a second internal fiber cell structure, wherein cells of said second cell structure have a second longitudinal axis, said first and said second longitudinal axis being generally perpendicular when said panels are in a secured position, said fastener comprising:

a generally hollow, cylindrical body portion having a first open-end for receiving said anchoring material, and a second pointed tip having an anchoring material discharge opening, said body portion having a plurality of anchoring material discharge openings disposed therein for communicating said anchoring material from said body portion to said second internal cell structure.

9. The combination of claim 8, said fastener further comprising a knurled surface section on an outer wall of said body portion, said knurled surface section urging fibers of said second fiber cell structure of said second undrilled honeycomb panel into tension against said body portion to hold said fastener within said second internal fiber cell structure.

10. The combination of claim 9, said fastener further comprising a longitudinal slot extending along said outer wall from a distal-most end of said pointed tip to a proximal region of said body.

11. The combination of claim 8, wherein said body portion has a generally uniform diameter from said proximal region to a flared head section, said body portion diameter greater than the diameter of an individual cell of said first and second internal fiber cell structure of said panels.

12. The combination of claim 8, wherein each of said first and second honeycomb panels has an approximately equal thickness, and said fastener has a length greater than said thickness of each of said panels.

13. The combination of claim 8, wherein said second pointed tip is adapted to be received and retained in a blunt end of said body portion opposite said first open end.

* * * * *